United States Patent [19]

Kulik

[11] Patent Number: 4,852,697
[45] Date of Patent: Aug. 1, 1989

[54] WHEELCHAIR HANDBRAKES WITH ACTUATOR TUBE AND REPLACEABLE BRAKE STOPPER

[76] Inventor: Helmut Kulik, 169 Green Pond Rd., Rockaway, N.J. 07866

[21] Appl. No.: 293,359

[22] Filed: Jan. 4, 1989

[51] Int. Cl.$^4$ ............................................... B60T 1/04
[52] U.S. Cl. ..................................... 188/2 F; 188/29; 280/304.1
[58] Field of Search ................... 188/2 F, 20, 29, 83, 188/2 R, 2 D, 17, 57, 24.11, 24.15, 24.14, 74; 280/250.1, 304.1; 297/DIG. 4

[56] References Cited

U.S. PATENT DOCUMENTS

| 3,529,700 | 9/1970 | Marshall | 188/2 F X |
| 3,532,188 | 10/1970 | Kelz | 188/29 X |
| 3,800,916 | 4/1974 | Kjellberg et al. | 188/29 X |
| 4,033,433 | 7/1977 | Kirk | 188/29 X |
| 4,045,047 | 8/1977 | Buckley | 188/82.2 X |
| 4,127,282 | 11/1978 | Görlach et al. | 188/29 X |
| 4,128,144 | 12/1978 | Vassar | 188/29 X |
| 4,204,588 | 5/1980 | Kawecki | 188/2 F |
| 4,271,933 | 6/1981 | Pearce et al. | 188/2 F |
| 4,320,818 | 3/1982 | Knoche | 188/2 F |
| 4,322,093 | 3/1982 | Otto | 188/2 F X |
| 4,350,227 | 9/1982 | Knoche | 188/2 F |
| 4,360,213 | 11/1982 | Rudwick et al. | 280/250.1 |
| 4,384,732 | 5/1983 | Wierville | 188/2 F X |
| 4,560,033 | 12/1985 | DeWoody et al. | 188/2 F |
| 4,570,756 | 2/1986 | Minnebraker et al. | 188/2 F |
| 4,589,525 | 5/1986 | Phipps et al. | 188/2 F |
| 4,618,033 | 10/1986 | Kassai | 188/20 |
| 4,623,043 | 11/1986 | Babilas | 188/2 F |
| 4,691,933 | 9/1987 | Strauss | 188/2 F X |
| 4,770,431 | 9/1988 | Kulik | 280/304.1 X |
| 4,779,885 | 10/1988 | Zinn | 280/304.1 |

FOREIGN PATENT DOCUMENTS 1243032 8/1971 United Kingdom ............... 188/2 F

Primary Examiner—Douglas C. Butler

[57] ABSTRACT

A brake device for use with wheelchairs of the type having a main frame and a pair of spaced apart large diameter driving wheels, such as rear wheels. The brake device is to be engaged by a secondary operator of a wheelchair and comprises a bracket or other mounting element for mounting to the wheelchair handles and a brake arm which is shiftable to a wheel locking position to move an actuator tube and attached stopper into engagement with the rear wheel of a wheelchair to lock the wheel against further rotation. The brake arm is also capable of being shifted to a reverse or non-locking position so that it moves the actuator tube and attached stopper out of engagement with the wheelchair driving wheel to a position where it can not be engaged with the driving wheel to permit free-wheeling movement thereof. The brake device is constructed so that the actuator tube and attached stopper is moveable to a non-interfering position where it is generally perpendicular to the plane of rotation of the wheel and is not likely to be contacted by the hand of a user.

3 Claims, 1 Drawing Sheet

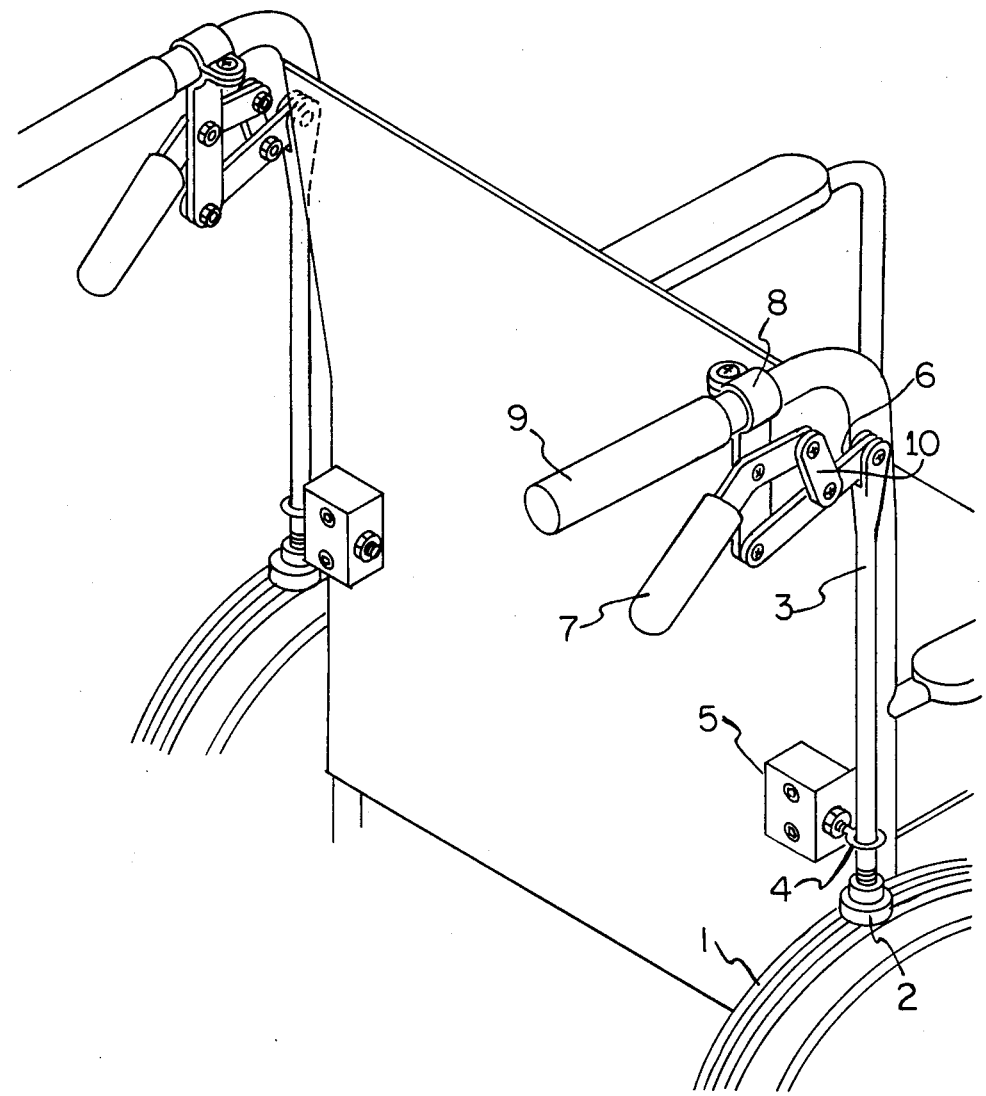

WHEELCHAIR HANDBRAKES WITH ACTUATOR TUBE AND REPLACEABLE BRAKE STOPPER

BACKGROUND OF THE INVENTION

1. Field of Invention

The present invention relates to the field of wheelchairs and in particular to an auxiliary wheelchair braking apparatus which enables a person pushing the wheelchair to readily perform auxiliary braking functions.

2. Description of the Prior Art

At the present state-of-the-art, almost all wheelchairs use a side-mounted locking lever brake system to be operated by the seated patient. Albeit effective, the system is in a position that is readily accessible only to the patient and since a great deal of patients are provided locomotion by an ancillary aid, the position of the brakes is not suitable for the person pushing the wheelchair. Since many public areas like shopping centers are providing wheelchair ramps and since not everyone pushing wheelchairs are suitably strong enough to prevent a patient and his wheelchair from uncontrollably rolling down these ramps, it would follow that what is needed is an auxiliary locking braking apparatus placed in a position suitable to the ancillary operator of the wheelchair.

SUMMARY OF THE INVENTION

It is, therefore, a primary object of the present invention to provide a brake mechanism that is readily operable by someone pushing a wheelchair.

It is a further object to provide a manually operated wheelchair brake that includes a brake locking arm capable of a lockable and non-lockable positions which force an actuator tube with attached stopper to engage and disengage with the rear wheels of a wheelchair.

BRIEF DESCRIPTION OF THE DRAWING

The single FIGURE is a side elevational view of a conventional wheelchair incorporating the present invention.

DETAILED DESCRIPTION OF THE PREFERRED EMBODIMENTS

The single FIGURE illustrates the use of the brake applied to a conventional wheelchair. The mounting bracket (8) is attached to the wheelchair handle (9). The mounting bracket (8) is pivotally coupled to the brake arm (7) and the actuator arm (10). The self locking mechanism (6) pivotally connects the brake arm (7) to the actuator arm (10). The actuator arm (10) pivotally connects to the actuator tube (3) which transcends through the threaded eyebolt (4) which is coupled to the mounted actuator tube guide (5). At the end of the actuator tube is a replaceable stopper (2) which engages with the rear wheelchair wheel (1) when the brake arm (7) is placed in a locking position and disengages when the brake arm (7) is in a non-locking position.

What is claimed as new is the following:

1. A manually-operated wheelchair brake and brake locking device which enables a person pushing the wheelchair to perform auxiliary braking and brake locking functions, comprising a fixed, generally vertically oriented brake mounting bracket (8) fixedly attached at one end to a wheelchair handle(9), a brake lever arm(7) with a first end including a brake handle, and intermediate portion and a second end, the brake lever arm(7) being pivotally connected at said intermediate portion thereof to an intermediate part of said mounting bracket(8), an opposite end of said mounting bracket(8) being pivotally connected at one end of a self-locking lever mechanism(6), a brake lever actuator arm(10) pivotally connected at one of its ends to the second end of the brake lever arm(7) opposite the brake handle and the brake arm(10) pivotally connected at the other of its ends to the self-locking mechanism(6) at an intermediate location of said mechanism(6), the other end of the self-locking mechanism(6) being pivotally connected to a vertically disposed and vertically acting brake actuator tube(3), said tube(3) vertically descending from one of its ends from the other end of said self-locking mechanism(6), said actuator tube(3) transcending down through an actuator tube guide(4) which guide is in the form of a threaded eyebolt(4) connected to the wheelchair, the other end of said actuator tube(3) including a replaceable stopper(2) which brakes or engages and locks the upper arcuate or circumferential surface of the rear wheel(1) of the wheelchair when said brake lever arm(7) is placed in a locking position and disengages when said brake lever arm(7) is in a non-locking position wherein the brake device is generally perpendicular to the plane of rotation of the wheel.

2. A manually-operated wheelchair brake and brake locking device according to claim 1, wherein the wheelchair is of the type having a main frame and a pair of spaced apart large diameter rear wheels.

3. A manually-operated wheelchair brake and brake locking device according to claim 2, wherein each said rear wheel includes a similar said wheelchair brake and brake locking device.

* * * * *